United States Patent Office 3,371,087
Patented Feb. 27, 1968

3,371,087
1 - HALOMETHYL - 5α - ANDROSTANES AND -Δ¹-ANDROSTENES AND PROCESSES FOR THEIR PREPARATION
Colin C. Beard, Boulder, Colo., assignor to Syntex Corporation, Panama, Panama, a corporation of Panama
No Drawing. Filed Mar. 25, 1966, Ser. No. 537,323
10 Claims. (Cl. 260—239.55)

This invention relates to novel steroids and to their production.

More particularly, this invention is directed at 1-halomethyl-5α-androstanes represented by the formula:

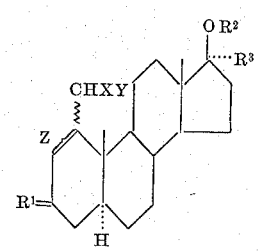

(VII)

wherein $R^1$ is an oxygen atom or the group

in which $R^4$ is hydrogen, tetrahydropyranyl, or a hydrocarbon carboxylic acyl group; $R^2$ is hydrogen, tetrahydropyranyl, or a hydrocarbon carboxylic acyl group; $R^3$ is hydrogen, methyl, ethyl, or ethynyl; each of X and Y is chloro or fluoro; and Z is a carbon-carbon single bond or a carbon-carbon double bond. The wavy line ($\xi$) embraces both the α and β configurations.

The hydrocarbon carboxylic acyl groups of the present invention will contain less than 12 carbon atoms and may be of a straight, branched, cyclic or cyclic-aliphatic chain structure. These may be saturated, unsaturated or aromatic and optionally substituted by functional groups such as hydroxy, alkoxy containing up to 5 carbon atoms, acyloxy containing up to 12 carbon atoms, nitro, amino, halogeno, and the like. Typical esters thus include acetate, propionate, enanthate, benzoate, trimethyl-acetate, t-butylacetate, phonoxyacetate, cyclopentylpropionate, aminoacetate, β-chloropropionate, adamantoate, and the like.

The compounds of this invention represented above are anabolic agents and are accordingly useful in the treatment of debilatory conditions such as are encountered in old age, postoperative recuperation, and the like. The 17α-ethynyl compounds, in addition, exhibit progestational activity and are thus useful in the control and regulation of fertility.

These compounds may be prepared according to the following reaction scheme:

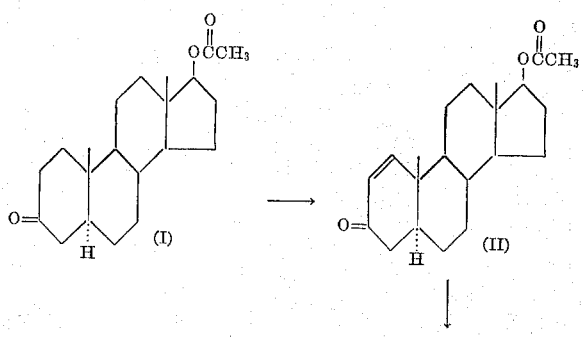

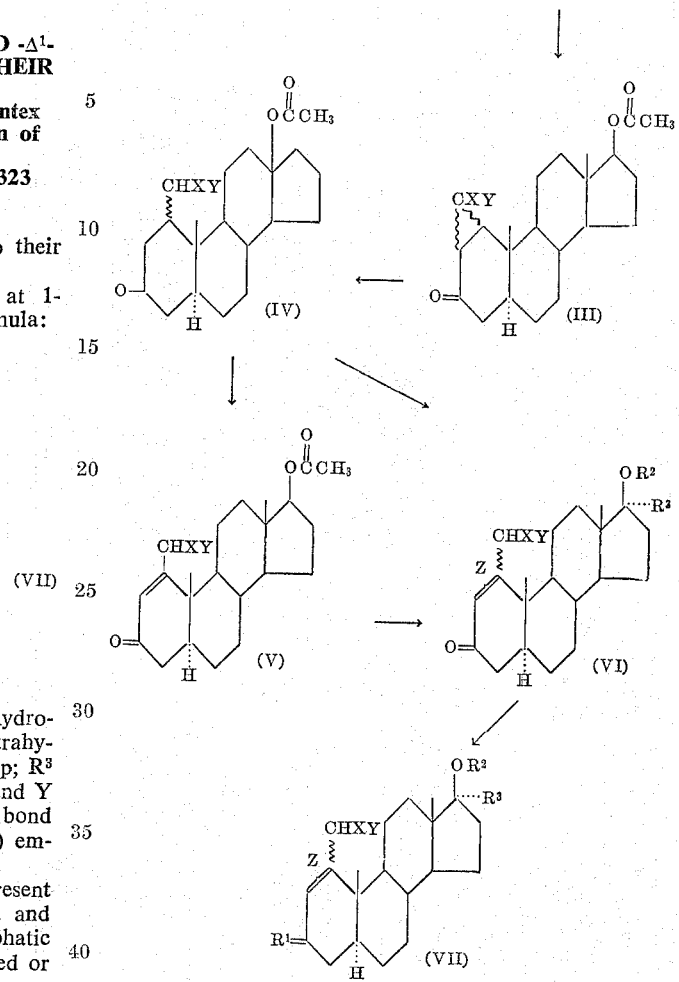

wherein each of $R^1$, $R^2$, $R^3$, X, Y, and Z is as hereinbefore defined.

Referring to the above scheme, the starting steroid (I) is provided from 5α-androstan-17β-ol-3-one upon conventional acylation of the 17-hydroxyl group with acetic anhydride in pyridine.

The Δ¹-unsaturation (II) is provided by brominating the saturated starting compound (I) followed by calcium carbonate treatment. The thus prepared Δ¹-ene is thereafter contacted with an alkali metal haloacetate notably sodium trifluoroacetate, sodium trichloroacetate, or sodium dichlorofluoroacetate at a temperature above the decomposition temperature of the salt employed, thus giving the 1,2-halomethylene derivative (III). This compound is then treated so as to effect opening of the fused cyclopropyl ring such as with zinc dust in acetic acid or other suitable reagents including zinc amalgams, for example, zinc-copper metal couple, in a variety of solvents such as the lower carboxylic acids, organic alcohols, ethers, and hydrocarbons.

After the ring opening has been effected, the thus prepared 1-halomethyl derivatives (IV) may be treated with bromine and calcium carbonate as described above to reintroduce the Δ¹-unsaturation (V). Either the saturated derivatives (IV) or the Δ¹-enes (V) are then elaborated at the C-17 position as follows.

If desired, the 17β-acetoxy group can be removed upon base treatment thus affording the 17β-hydroxy compound.

This 17β-hydroxyl may be etherified with dihydropyran in the presence of acid catalyst to yield the 17β-tetrahydropyranyloxy ether. Alternatively, the secondary 17β-hydroxyl can be esterified with an acylating agent such as adamantoyl chloride or acetic anhydride in pyridine.

In lieu of the above procedures, the 17β-hydroxyl, provided upon base hydrolysis of the 17-acetate, may be oxidized such as with chromic acid to the 17-keto derivative. This 17-keto compound may then be treated with methyl- or ethylmagnesium bromide or methyl- or ethyllithium to give the 17α-methyl- and 17α-ethyl-17β-ols. The 17α-ethynyl-17β-ol steroid is provided upon treatment of the 17-keto compound with acetylene in the presence of potassium in organic solution. The 17α-ethyl group may alternately be provided upon controlled hydrogenation of the 17α-ethynyl group, provided as above.

The tertiary 17β-hydroxyl may be etherified as above or esterified with acylating agent in the presence of acid catalyst such as acetic anhydride in acetic acid, p-toluenesulfonic acid, and the like.

Before such elaboration of the C–17 keto takes place, the 3-keto group is preferably protected such as by forming the corresponding 3-ketal by treatment with ethylene glycol in benzene in the presence of p-toluenesulfonic acid. This protecting group at C–3 is finally removed in the usual manner such as by acidic treatment to afford the corresponding 3-keto compound fully substituted at C–17 (VI) as outlined above.

The restored 3-keto group may be reduced such as with sodium borohydride in methanol or lithium aluminum hydride in tetrahydrofuran to give the 3β-hydroxy steroid. This secondary hydroxyl may be esterified as described above to afford the 3β-ester or it may be etherified with dihydropyran in the presence of any stable sulfonyl chloride, preferably p-toluene-sulfonyl chloride, benzenesulfonyl chloride, methanesulfonyl chloride, and the like to give the 3β-tetrahydropyranyloxy ether. Thus provided are the products of this invention represented by Formula VII.

The following examples serve to illustrate the invention more fully but are not intended as limitations upon the scope hereof except insofar as indicated in the appended claims.

*Example 1*

A mixture of 1 g. of 5α-androstan-17β-ol-3-one, 4 ml. of pyridine, and 2 ml. of acetic anhydride is allowed to stand at room temperature for 15 hours. The mixture is then poured into ice water and the solid which forms is collected by filtration, washed with water and dried to yield 17β - acetoxy - 5α - androstan-3-one which may be further purified through recrystallization from acetone:hexane.

To a stirred solution of 1 g. of 17β-acetoxy-5α-androstan-3-one and 6.6 g. of p-toluenesulfonic acid in 330 ml. of glacial acetic acid is added, over a 10-minute period, a solution of 1.1 molar equivalent of bromine and 2.45 g. of sodium acetate in 110 ml. of glacial acetic acid. After stirring for an additional 10-minute period, a solution of 75 g. of sodium acetate in 150 ml. of glacial acetic acid is added and stirring is then continued at 20° C. for 5 minutes. The reaction mixture is next poured into 1 liter of ice water and the solid which forms is collected and dissolved in methylene chloride. This solution is washed with water, dilute sodium bicarbonate solution and water, dried and evaporated to dryness. The residue is dissolved in 60 ml. of dimethylformamide and added to a well stirred suspension of 12.5 g. of calcium carbonate in 440 ml. of dimethylacetamide, heated at reflux. Refluxing is continued for 45 minutes and the mixture is then filtered and concentrated to about 60 ml. under reduced pressure. After the addition of 5 ml. of hexane, the mixture is filtered and the filtrate is evaporated to dryness. This residue is chromatographed on acid washed alumina with 3:1 benzene:chloroform to yield 17β-acetoxy-5α-androst-1-en-3-one which may be recrystallized from cyclohexane:ethyl acetate.

To a stirred and refluxing solution of 1 g. of 17β-acetoxy-5α-androst-1-en-3-one in 8 ml. of dimethyl diethyleneglycol ether is added in a dropwise fashion over a two-hour period, a solution of 30 equivalents of sodium chlorodifluoroacetate in 30 ml. of dimethyl diethyleneglycol ether. At the end of the reaction period, which may be followed by the U.V. spectra, the mixture is filtered and evaporated in vacuo to dryness. The residue is added to 10% methanolic potassium hydroxide and this mixture is heated briefly at reflux and poured into ice water. The solid which forms is collected, washed with water, dried and chromatographed on alumina, eluting with methylene chloride, to yield 1α,2α-difluoromethylene-17β-acetoxy-5α-androstan-3-one together with the corresponding 1β,2β-difluoromethylene derivative which may be readily separated by chromatography.

The use of sodium trichloroacetate and sodium dichlorofluoroacetate for sodium trifluoroacetate in the above procedure respectively provides the corresponding 1,2 - dichloromethylene and 1,2 - chlorofluoromethylene derivatives.

A stirred solution of 16 g. of 1α,2α-difluoromethylene-17β-acetoxy-5α-androstan-3-one in 5 ml. of acetic acid is heated at reflux for 1 hour with several portions of zinc dust. The mixture is then stirred at room temperature for 1 hour, filtered, the residue being washed with acetic acid, and diluted with 10 ml. of water. This mixture is extracted with methylene chloride and the methylene chloride extracts are in turn washed with water, 2 N sodium bicarbonate solution, and water. After drying this organic solution with magnesium sulfate, it is evaporated to dryness and chromatographed on alumina with hexane:methylene chloride followed by methylene chloride:ethyl acetate to yield 1α-difluoromethyl-17β-acetoxy-5α-androstan-3-one.

Treatment of the 1α-dihalomethyl steroid above with bromine and calcium carbonate by the procedures given in paragraph two of this example affords the corresponding 1-dihalomethyl-17β-acetoxy-5α-androst-1-en-3-one.

*Example 2*

A solution of 1 g. of 1α-difluoromethyl-17β-acetoxy-5α-androstan-3-one in 50 ml. of methanol is heated at reflux for 3 hours with a solution of potassium hydroxide in 1 ml. of water. The reaction mixture is then poured into ice water and the solid which forms collected by filtration, washed with water to neutrality and dried to yield 1α-difluoromethyl-5α-androstan-17β-ol-3-one which is recrystallized from methylene chloride:ether.

Two milliliters of dihydropyran are added to a solution of 1 g. of 1α-difluoromethyl-5α-androstan-17β-ol-3-one in 15 ml. of benzene. About 1 ml. is removed by distillation to remove moisture and 0.4 g. of p-toluenesulfonic acid is added to the cooled solution. This mixture is allowed to stand at room temperature for 4 days, and is then washed with aqueous sodium carbonate solution and water, dried and evaporated. The residue is chromatographed on neutral alumina, eluting with hexane, to yield 1α-difluoromethyl-17β-tetrahydropyranyloxy - 5α - androstan - 3 - one which is recrystallized from pentane.

A mixture of 2 g. of 1α-difluoromethyl-5α-androstan-17β-ol-3-one in 8 ml. of pyridine and 4 ml. of adamantoyl chloride is heated at steam bath temperatures for one hour. The mixture is then poured into ice water and the solid which forms is collected by filtration, washed with water and dried to yield 1α-difluoromethyl-17β-adamantoyloxy - 5α - androstan - 3 - one which is further purified through recrystallization from methylene chloride:hexane.

Similarly, 1-dihalomethyl-17β-acetoxy-5α-androst-1-en- 3-one is hydrolyzed by the procedure given above to yield 1-dihalomethyl-5α-androst-1-en-17β-ol-3-one. This compound is then treated with dihydropyran as outlined above to yield 1-difluoromethyl-17β-tetrahydropyranyloxy-5α-androst-1-en-3-one and with adamantoyl chloride, similarly outlined above to give 1-difluoromethyl-17β-adamantoyloxy-5α-androst-1-en-3-one. In a similar manner the corresponding 17β-ethers and -esters of the other 1α-dihalomethyl steroids mentioned above are prepared. Other 17β-esters are prepared in accordance with the esterification procedure given above upon substitution of alternate acylating agents.

Example 3

A mixture of 1 g. of 1α-difluoromethyl-5α-androstan-17β-ol-3-one, 25 ml. of dry benzene, 5 ml. of ethylene glycol and 50 mg. of p-toluenesulfonic acid monohydrate is refluxed for 16 hours using a water separator. The reaction mixture is then washed with aqueous sodium bicarbonate solution and water, dried and evaporated to dryness to yield 1α-difluoromethyl-3,3-ethylenedioxy-5α-androstan-17β-ol which is recrystallized from acetone:hexane.

To a stirred solution of 1 g. of 1α-difluoromethyl-3,3-ethylenedioxy-5α-androstan-17β-ol in 10 ml. of acetone, cooled to 0° C., is added under nitrogen a solution of 8 N chromic acid (prepared by mixing 26 g. of chromium trioxide with 23 ml. of concentrated sulfuric acid and diluting with water to 100 ml.) until the color of the reagent persists in the mixture. The mixture is then stirred for 5 minutes at 0-5° C. and diluted with water. The solid which forms is collected by filtration, washed with water and dried under vacuum to yield 1α-difluoromethyl-3,3-ethylenedioxy-5α-androstan-17-one which may be further purified by recrystallization from acetone:hexane.

A solution of 5 g. of 1α-difluoromethyl-3,3-ethylenedioxy-5α-androstan-17-one in 250 ml. of thiophene-free benzene is treated with 27.5 ml. of 4 N methylmagnesium bromide in anhydrous ether. The mixture is heated at reflux under anhydrous conditions for 3 hours, cooled, and cautiously treated with excess aqueous ammonium chloride solution. This mixture is then extracted with ethyl acetate and these extracts are in turn washed with water, dried over sodium sulfate and evaporated to dryness to yield 1α-difluoromethyl-3,3-ethylenedioxy-17α-methyl-5α-androstan-17β-ol which is recrystallized from methylene chloride:hexane.

A mixture of 0.5 g. of 1α-difluoromethyl-3,3-ethylenedioxy-17α-methyl-5α-androstan-17β-ol in 30 ml. of acetone and 50 mg. of p-toluenesulfonic acid is allowed to stand to room temperature for 15 hours. It is then poured into ice water and extracted with ethyl acetate. These extracts are washed with water to neutrality, dried over sodium sulfate and evaporated to dryness. The residue is triturated with ether to yield 1α-difluoromethyl-17α-methyl-5α-androstan-17β-ol-3-one which is recrystallized from acetone:hexane.

Example 4

To a stirred solution of 2 g. of 1α-difluoromethyl-3,3-ethylenedioxy-5α-androstan-17-one in 250 ml. of absolute ether is added in a dropwise fashion and under nitrogen, an ethereal solution of 10 molar equivalents of ethyl lithium. The mixture is then stirred for 48 hours at room temperature, poured into water, acidified with hydrochloric acid and stirred vigorously for 1 hour. The ethereal phase is separated, washed with water to neutrality, dried over sodium sulfate and evaporated to dryness to yield 1α-difluoromethyl-3,3-ethylenedioxy-17α-ethyl-5α-androstan-17β-ol which is further purified through recrystallization from acetone:hexane.

Acid hydrolysis via the procedure given in the last paragraph of Example 3 affords 1α-difluoromethyl-17α-ethyl-5α-androstan-17β-ol-3-one.

Example 5

A solution of 1 g. of 1α-difluoromethyl-3,3-ethylenedioxy-5α-androstan-17-one in 30 ml. of anhydrous benzene is added under nitrogen to a solution of 1.4 g. of potassium in 30 ml. of t-amyl alcohol. A slow current of purified acetylene is then passed through the solution for 40 hours. The mixture is diluted with water and extracted with benzene. These extracts are washed with water to neutrality, dried over sodium sulfate and evaporated. Chromatography of the residue on alkaline alumina with 2:3 hexane:benzene yields 1α-difluoromethyl-3,3-ethylenedioxy-17α-ethynyl-5α-androstan-17β-ol which is recrystallized from acetone:hexane.

Acid hydrolysis as above in Example 3 (last paragraph) thereafter yields 1α-difluoromethyl-17α-ethynyl-5α-androstan-17β-ol-3-one.

Similarly, when 1-difluoromethyl-5α-androst-1-en-17β-ol-3-one is used as the starting steroid in Examples 3, 4, and 5, the respective products obtained by each procedure after acid hydrolysis thereof are 1-difluoromethyl-17α-methyl-5-α-androst-1-en-17β-ol-3-one, 1-difluoromethyl-17α-ethyl-5α-androst-1-en-17β-ol-3-one, and 1-difluoromethyl-17α-ethynyl-5α-androst-1-en-17β-ol-3-one.

In like manner, the other 1α-dihalomethyl steroids of this invention are converted to the corresponding 17α-substituted-17β-ols.

Example 6

A mixture of 1 g. of 1α-difluoromethyl-17α-ethynyl-5α-androstan-17β-ol-3-one, 1 g. of p-toluenesulfonic acid monohydrate, 50 ml. of acetic acid and 25 ml. of acetic anhydride is allowed to stand at room temperature for 24 hours, and then poured into water and stirred. This mixture is then extracted with methylene chloride and these extracts are dried and evaporated to yield 1α-difluoromethyl-17α-ethynyl-17β-acetoxy-5α-androstan-3-one which is recrystallized from acetone:ether.

By substituting propionic anhydride for acetic anhydride, the corresponding 17β-propionoxy steroid is obtained.

Among other steroids similarly prepared in accordance with the above procedure utilizing the requisite starting 17β-ols are 1-difluoromethyl-17α-ethynyl-17β-acetoxy-5α-androst-1-en-3-one, 1α-difluoromethyl-17α-methyl-17β-acetoxy-5α-androstan-3-one, 1-difluoromethyl-17α-methyl-17β-acetoxy-5α-androst-1-en-3-one, 1α-difluoromethyl-17α-ethyl-17β-acetoxy-5α-androstan-3-one, and 1-difluoromethyl-17α-ethyl-17β-acetoxy-5α-androst-1-en-3-one as well as the 17α-substituted-17β-acetates of the other 1α-dihalomethyl steroids hereof.

The above mentioned 17α-substituted-17β-ols may also be treated with dihydropyran following the procedure of the second paragraph of Example 2 to thus yield the corresponding 17β-tetrahydropyranyl ethers thereof. Thus, for example, 1α-difluoromethyl-17α-ethynyl-17β-tetrahydropyranyloxy-5α-androstan-3-one, 1-difluoromethyl-17α-ethynyl-17β-tetrahydropyranyloxy-5α-androst-1-en-3-one, and 1α-difluoromethyl-17α-ethyl-17β-tetrahydropyranyloxy-5α-androstan-3-one are prepared as well as the ethers of the other above named 17α-substituted-17β-ol steroids.

Example 7

A solution of 1 g. of sodium borohydride in 3 ml. of water is added to an ice-cooled solution of 1 g. of 1α-difluoromethyl-17α-ethynyl-17β-tetrahydropyranyloxy-5α-androstan-3-one in 120 ml. of methanol and the mixture then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried and evaporated to yield 1α-difluoromethyl - 17α - ethynyl - 17β-tetrahydropyranyloxy-5α-androstan-3β-ol which may be further purified by recrystallization from acetone:hexane.

The thus reduced steroid is esterified by the procedure of Example 2, paragraph 3 to yield 1α-difluoromethyl-3β-adamantoyloxy - 17α - ethynyl - 17β-tetrahydropyranyloxy-5α-androstane.

The 3β-acetoxy may be provided therein by allowing a mixture of 1 g. of 1α-difluoromethyl-17α-ethynyl-17β-tetrahydropyranyloxy-5α-androstan-3β-ol, 4 ml. of pyridine, and 2 ml. of acetic anhydride to stand at room temperature for 15 hours. The mixture is then poured into ice water and the solid which forms is collected by filtration, washed with water and dried to yield 1α-difluoromethyl - 3β - acetoxy-17α-ethynyl-17β-tetrahydropyranyloxy-5α-androstane which may be further purified through recrystallization from acetone:hexane.

The 3β-tetrahydropyranyloxy group may be provided by the following procedure:

Two milliliters of dihydropyran are added to a solution of 1 g. of 1α-difluoromethyl-17α-ethynyl-17β-tetrahydropyranyloxy-5α-androstan-3β-ol in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane, to yield 1α-difluoromethyl-3β,17β - bis(tetrahydropyranyloxy) - 17α - ethynyl-5α-androstane which is recrystallized from pentane.

Thus also prepared via the above procedure is 1α-difluoromethyl - 3β - tetrahydropyranyloxy - 17α-ethynyl-17β-acetoxy-5α-androstane from the corresponding reduced steroid.

The above bisether may also be prepared upon similar treatment with two equivalents of dihydropyran from 1α-difluoromethyl - 17α - ethynyl - 5α-androstane-3β,17β-diol which is obtained from the corresponding 3-keto compound upon reduction following the procedure of the first paragraph hereof. Thus also prepared is 1-difluoromethyl - 3β,17β - tetrahydropyranyloxy - 17α-methyl-5α-androst-1-ene.

Similarly, by following the procedures outlined in this example upon the other steroids of this invention, the corresponding 3-substituted derivatives are prepared. Thus, by way of illustration, 1-difluoromethyl-3β,17β-diacetoxy-17α-ethyl-5α-androst-1-ene is prepared from 1 - difluoromethyl - 17α - ethyl - 17β - acetoxy - 5α-androst-1-en-3-one hereby.

Examples 2 through 7 have been illustrated utilizing steroids containing the 1α-dihalomethyl group. These procedures may be practiced upon the corresponding 1β-dihalomethyl steroids with similar results.

What is claimed is:
1. Steroids of the formula

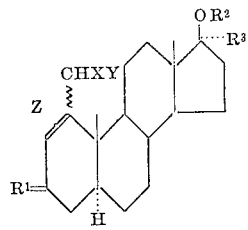

wherein $R^1$ is an oxygen atom or the group

in which $R^4$ is hydrogen, tetrahydrpyranyl, or a hydrocarbon carboxylic acyl group; $R^2$ is hydrogen, tetrahydropyranyl, or a hydrocarbon carboxylic acyl group; $R^3$ is hydrogen, methyl, ethyl, or ethynyl; each of X and Y is chloro or fluoro; and Z is a carbon-carbon single bond or a carbon-carbon double bond.

2. Steroids of claim 1 wherein each of X and Y is fluoro.

3. Steroids of claim 2 wherein Z is a carbon-carbon single bond.

4. A steroid of claim 3 wherein $R^1$ is an oxygen atom, $R^2$ is acetyl, and $R^3$ is ethynyl.

5. A steroid of claim 3 wherein $R^1$ is an oxygen atom, $R^2$ is tetrahydropyranyl, and $R^3$ is ethyl.

6. A steroid of claim 3 wherein $R^1$ is the group

in which $R^4$ is tetrahydropyranyl, $R^2$ is acetyl, and $R^3$ is ethynyl.

7. Steroids of claim 2 wherein Z is a carbon-carbon double bond.

8. A steroid of claim 7 wherein $R^1$ is the group

in which $R^4$ is tetrahydropyranyl, $R^2$ is tetrahydropyranyl, and $R^3$ is methyl.

9. A steroid of claim 7 wherein $R^1$ is the group

in which $R^4$ is acetyl, $R^2$ is acetyl, and $R^3$ is ethyl.

10. A steroid of claim 7 wherein $R^1$ is an oxygen atom, $R^2$ is hydrogen, and $R^3$ is methyl.

References Cited

UNITED STATES PATENTS 3,228,837   1/1966   Kaspar et al. _____ 167—74

LEWIS GOTTS, *Primary Examiner.*

T. M. MESHBESHER, *Assistant Examiner.*